US012792438B2

(12) United States Patent
Carvalho Lousada et al.

(10) Patent No.: US 12,792,438 B2
(45) Date of Patent: Nov. 10, 2026

(54) METHOD AND SYSTEM FOR RESILIENCE BASED UPON PROBABILISTIC ESTIMATE OF FAILURES

(71) Applicant: TELEFONAKTIEBOLAGET LM ERICSSON (PUBL), Stockholm (SE)

(72) Inventors: Alexandre Carvalho Lousada, Lyckeby (SE); Yukti Kaura, New Delhi (IN); Devesh Nigam

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 117 days.

(21) Appl. No.: 18/569,951

(22) PCT Filed: Sep. 23, 2021

(86) PCT No.: PCT/SE2021/050927
§ 371 (c)(1),
(2) Date: Dec. 13, 2023

(87) PCT Pub. No.: WO2022/571058
PCT Pub. Date: Dec. 29, 2022

(65) Prior Publication Data
US 2024/0419527 A1 Dec. 19, 2024

(30) Foreign Application Priority Data
Jun. 21, 2021 (IN) ............................ 202141027688

(51) Int. Cl.
*G06F 11/07* (2006.01)
*G06F 11/14* (2026.01)

(52) U.S. Cl.
CPC ........ *G06F 11/076* (2013.01); *G06F 11/0709* (2013.01); *G06F 11/1441* (2013.01); *G06F 2201/81* (2013.01)

(58) Field of Classification Search
CPC . G06F 11/076; G06F 11/0709; G06F 11/1441
See application file for complete search history.

(56) References Cited

U.S. PATENT DOCUMENTS 11,222,272 B2 * 1/2022 Mahyar ................ H04L 67/568
11,392,445 B2 * 7/2022 Balasubramanian ........................ G06F 11/3006

(Continued)

FOREIGN PATENT DOCUMENTS

CN 111736975 A 10/2020

OTHER PUBLICATIONS

Li et al., "Understanding and addressing quality attributes of microservices architecture: A Systematic literature review", Information and Software Technology, Elsevier, Amsterdam, NL, vol. 131, Oct. 31, 2020 (23 pages).

(Continued)

*Primary Examiner* — Jigar P Patel
(74) *Attorney, Agent, or Firm* — ROTHWELL, FIGG, ERNST & MANBECK, P.C.

(57) ABSTRACT

A method for providing resilience in a computing environment is provided. The method includes, prior to making a request to a first service, determining a first probability based on environment parameters, wherein the first probability represents a likelihood of the request to the first service failing. The method includes determining that the first probability meets or exceeds a first threshold. The method includes, as a result of determining that the first probability meets or exceeds the first threshold, (i) declining to make the request to the first service and (ii) incrementing a counter, wherein the counter is an internal variable for determining a circuit breaker state.

16 Claims, 12 Drawing Sheets

(56) References Cited

U.S. PATENT DOCUMENTS

| | | | | |
|---|---|---|---|---|
| 2010/0033888 | A1* | 2/2010 | Dougherty | G01R 31/54 702/58 |
| 2019/0129813 | A1 | 5/2019 | Sankarasubramanian et al. | |
| 2019/0222526 | A1* | 7/2019 | Edwards | H04L 67/02 |
| 2019/0250955 | A1 | 8/2019 | Sethi et al. | |
| 2020/0045117 | A1 | 2/2020 | Ross et al. | |
| 2020/0120000 | A1 | 4/2020 | Parthasarathy et al. | |
| 2021/0029210 | A1* | 1/2021 | Hulick, Jr. | H04L 67/561 |

OTHER PUBLICATIONS

International Search Report and Written Opinion with Transmittal dated Feb. 10, 2022, issued in International Patent Application No. PCT/SE2021/050927 (12 pages).

N. C. Mendonca, et al., "Model-Based Analysis of Microservice Resiliency Patterns," 2020 IEEE International Conference on Software Architecture (ICSA), 2020, pp. 114-124.

M. Fowler, "Circuit Breaker" https://martinfowler.com/bliki/CircuitBreaker.html, Mar. 6, 2014 (6 pages).

U. Friedrichsen, "Patterns of Resilience A small pattern language", https://www.slideshare.net/ufried/patterns-of-resilience, codecentric AG—2014, (81 pages).

* cited by examiner

METHOD AND SYSTEM FOR RESILIENCE BASED UPON PROBABILISTIC ESTIMATE OF FAILURES

CROSS REFERENCE TO RELATED APPLICATIONS

This application is a 35 U.S.C. § 371 National Stage of International Patent Application No. PCT/SE2021/050927, filed 2021 Sep. 23, which claims priority to Indian Patent Application No. 202141027688, filed 2021 Jun. 21.

TECHNICAL FIELD

Disclosed are embodiments related to a method and system for resilience based upon probabilistic estimate of failures.

BACKGROUND

Making remote calls to software running in different processes, including on different machines across a network, can result in failure, or hanging without a response, until some time-out limit is reached. When coordinating across multiple remote calls, handling that failure in an appropriate way is necessary. One approach known in the art is to use a circuit breaker (CB) technique, such as illustrated in FIG. 1. This technique takes a proactive approach to failure, based on the principle of “failing fast.” The CB technique “fails fast” in the sense that, for example, in case of overload or network outage, the circuit breaker will stop normal operation rather than attempt to continue a possibly flawed process. This can have the effect of offsetting further disruption.

Avoiding failures in this way is important particularly in scenarios where the continuation of the failed executions can lead to inconsistencies. For example, inconsistencies here may include inconsistent data getting persisted.

The CB technique relies on a method that counts the number of failed requests towards a particular channel or service. Client 102 makes requests to server 104. If the request succeeds, the counter is unchanged, but if the request fails, the counter is incremented. The counter is compared against a pre-configured circuit breaker threshold (which is 3 in the illustrated example). While the counter is below the threshold the CB remains in the closed state 110. Once the counter reaches the threshold, the CB is tripped to the open state 112. While in the open state 112, the CB immediately blocks requests from being sent to that channel or service which is facing problems. The CB remains in the open state 112 until a configured reset time-out is reached, when it can verify if normal operation (closed state 110) can be reestablished for that channel or service. In some examples, verifying if normal operation can be reestablished takes place in a half-open state. That is, after a timeout period, the circuit switches to a half-open state to test if the underlying problem still exists. If a single call fails in this half-open state, the breaker is once again tripped. If it succeeds, the circuit breaker resets back to the normal closed state.

When the circuit breaker is open the client 102 may decide take different approaches depending on the nature of the involved service: e.g., to call an alternate API if the primary one is down or under load, return cached data from a previous response, notify the user, provide feedback to the user and retry the action in the background, and/or log problems to logging services.

There are other approaches where the analysis of performance degradation is used to determine actions towards services operations. For example, US20170046146A1 discusses autonomously healing microservice-based applications. The method comprises the steps of detecting a performance degradation of at least a portion of the application; and responsive to detecting the performance degradation, downgrading at least one of the plurality of microservices within the application.

REFERENCES

[1] CircuitBreaker, Martin Fowler, 6 Mar. 2014, https://martinfowler.com/bliki/CircuitBreaker.html

[2] Patterns of resilience, Uwe Friedrichsen, 5 Nov. 2014, https://www.slideshare.net/ufried/patterns-of-resilience

SUMMARY

Circuit breaker techniques needs to be tuned to an optimal counter threshold. Resorting to a higher counter threshold (requiring a high number of failures) leads to unnecessary failures in order to trip the breaker, and consequently more inconsistency as a result of the failures. Alternatively, a lower counter threshold (requiring a low number of failures) leads to more downtime in that channel or service. Existing CB technique thus relies on a deterministic counter to trigger the open state. Such a deterministic way to evaluate a failure scenario has as a main downside the incapability to foresee trends. When a CB relies only on the counting of absolute failed requests as the criteria to trip the circuit breaker, such an approach is not optimized, since it does not foresee any future tendencies. This represents a waste of resources or a non-ideal performance.

This sort of deterministic approach to evaluating a failure scenario, as used by typical CB techniques, has as a primary downside the inability to foresee trends or statistical tendencies. This sort of approach therefore wastes resources and has non-optimal performance. For example, setting the threshold for tripping the open state of the CB is problematic.

The alternative approaches described in the background (e.g., autonomously healing microservice-based applications) also rely on deterministic methods to evaluate the channel or service degradation and decide on how to act (as the regular CBs do) based on only the counting of absolute failed requests.

Embodiments provide for a statistical estimator that can predict the likelihood of failure of a given request to a service. This statistical estimator can be added before a request to a service is made, such that if the likelihood of failure is too high then the request may be blocked and the counter of the CB incremented without having to incur a failed request. On the other hand, if the likelihood of failure is not too high, the request may proceed and the counter will be incremented if the request fails.

Advantages of embodiments are that they help to prevent inconsistent states in the system, reduce the amount of network I/O, reduce load on an already stressed server resource, and require less “real” failures to predict the risk for fault.

According to a first aspect, a method for providing resilience in a computing environment. The method includes, prior to making a request to a first service, determining a first probability based on environment parameters, wherein the first probability represents a likelihood of the request to the first service failing. The method includes determining that the first probability meets or exceeds a first threshold. The method includes as a result of determining that the first probability meets or exceeds the first threshold, (i) declining to make the request to the first service and (ii) incrementing a counter, wherein the counter is an internal variable for determining a circuit breaker state.

In some embodiments, the method further includes, prior to making a second request to a first service, determining a second probability based on environment parameters, wherein the second probability represents a likelihood of the second request to the first service failing. The method includes determining that the second probability is below a first threshold. The method includes, as a result of determining that the second probability is below the first threshold, (i) making the second request to the first service and (ii) incrementing a counter if the second request to the first service fails, wherein the counter is an internal variable for determining a circuit breaker state.

In some embodiments, the method further includes, prior to making additional requests to the first service, determining additional probabilities based on environment parameters, wherein the additional probabilities represent a likelihood of the additional requests to the first service failing. The method further includes determining, for each of the additional requests to the first service, whether the corresponding probability meets or exceeds the first threshold. The method further includes, for each of the additional requests to the first service, if the corresponding probability meets or exceeds the first threshold (i) declining to make the corresponding request to the first service and (ii) incrementing the counter; and if the corresponding probability is below the threshold then (i) making the corresponding request to the first service and (ii) incrementing the counter if the corresponding request to the first service fails. The method includes determining that the counter exceeds a second threshold. The method includes, as a result of determining that the counter exceeds the second threshold, transitioning to an open circuit breaker state for the first service, where requests to the first service are disabled during the open circuit breaker state.

In some embodiments, determining a first probability based on environment parameters comprises using a rule-based estimator. In some embodiments, determining a first probability based on environment parameters comprises using machine learning. In some embodiments, using machine learning includes applying deep reinforcement learning. In some embodiments, the environment parameters the first probability is based on feedback signals from the first service, including one or more of a round-trip time, an acknowledgement (ACK) message, a negative acknowledgment (NACK) message, a node state indicator, and a cluster health indicator. In some embodiments, the first service performs a storage operation. In some embodiments, the first service performs a charging function. In some embodiments, the first service comprises a group of services or microservices. In some embodiments, the first service is provided by a node in a telecommunications network, and determining the first probability based on environment parameters is performed in a cloud computing environment. In some embodiments, the first service is a network function managed by an orchestration layer.

According to a second aspect, a computer program comprising instructions which when executed by processing circuitry of a node, causes the node to perform the method of any one of the embodiments of the first and second aspects.

According to a third aspect, a carrier containing the computer program of the third aspect is provided. The carrier is one of an electronic signal, an optical signal, a radio signal, and a computer readable storage medium.

According to a fourth aspect, a network node is provided. The network node includes processing circuitry. The network node includes a memory, the memory containing instructions executable by the processing circuitry, whereby the network node is configured to perform the method of any one the embodiments of the first and second aspects.

According to a fifth aspect, a network node for providing resilience in a computing environment is provided. The network node is configured to, prior to making a request to a first service, determine a first probability based on environment parameters, wherein the first probability represents a likelihood of the request to the first service failing. The network node is configured to determine that the first probability meets or exceeds a first threshold. The network node is configured to, as a result of determining that the first probability meets or exceeds the first threshold, (i) decline to make the request to the first service and (ii) increment a counter, wherein the counter is an internal variable for determining a circuit breaker state.

In some embodiments, the network node is further configured to, prior to making a second request to a first service, determine a second probability based on environment parameters, wherein the second probability represents a likelihood of the request to the first service failing. The network node is configured to determine that the second probability is below a first threshold. The network node is configured to, as a result of determining that the second probability is below the first threshold, (i) make the second request to the first service and (ii) increment a counter if the second request to the first service fails, wherein the counter is an internal variable for determining a circuit breaker state.

In some embodiments the network node of the sixth aspect or the seventh aspect is configured to perform the method of any one of the embodiments of the first aspect and the second aspect.

BRIEF DESCRIPTION OF THE DRAWINGS

The accompanying drawings, which are incorporated herein and form part of the specification, illustrate various embodiments.

DETAILED DESCRIPTION

Figure 1:
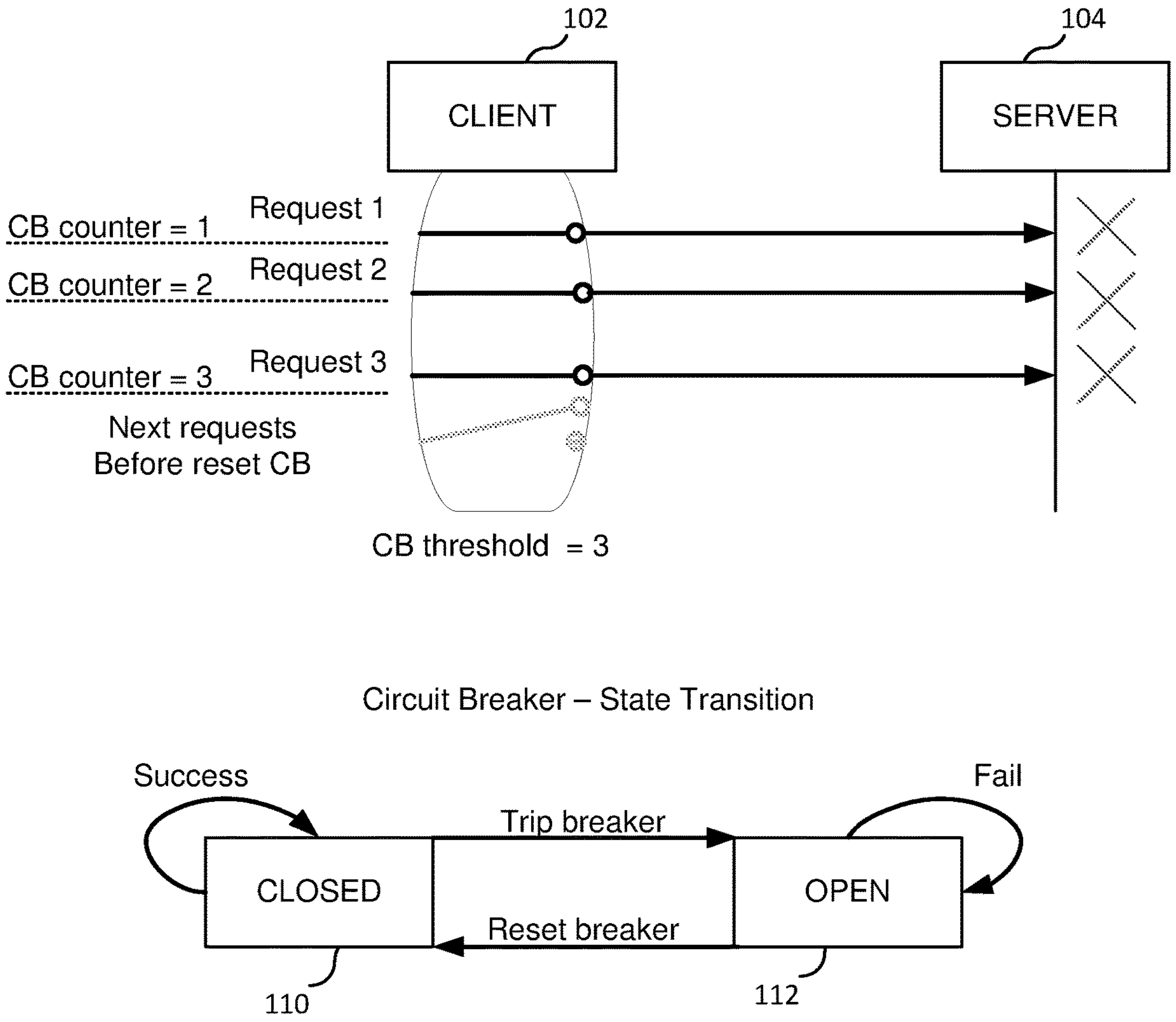
FIG. 1 illustrates a typical circuit breaker technique according to related art.
Figure 2:
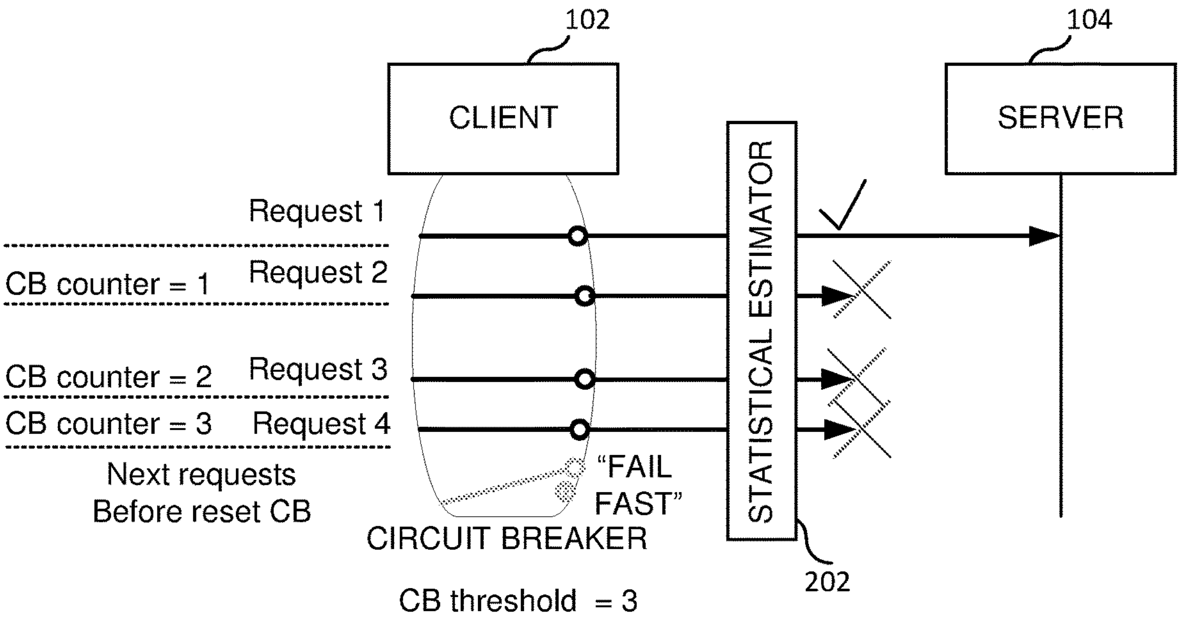
FIG. 2 illustrates a modified circuit breaker technique according to an embodiment.

FIG. 2 illustrates a CB estimator according to an embodiment. As in the typical CB technique, client 102 makes requests to server 104. Prior to making a given request, a statistical estimator 202 may be used to determine a probability that the given request will succeed (or a probability that the given request will fail). As shown, request 1 is allowed to proceed, meaning that the statistical estimator 202 has determined the probability that request 1 will succeed as being meeting or exceeding a probability threshold. As shown, requests 2-4 are each blocked by the statistical estimator 202, meaning that the statistical estimator 202 has determined the probability that each of requests 2-4 will succeed as being below a probability threshold. As each of requests 2-4 are blocked, the CB counter is incremented, until it reaches the CB threshold (as shown this is 3) and the CB is opened. Once open, the CB enters the closed state again, for example, after a time-out period or otherwise determining that the CB should be reset.

A probability p that a request will succeed is equivalent to a probability 1−p that a request will fail. If 1−p meets or exceeds a probability threshold, that indicates that the request is likely to fail. If a probability of success (p) is used, it can be converted to a probability of failure (1−p) that can be checked against the threshold, so that if (1−p) meets or exceeds a threshold, that indicates the request is likely to fail. Whether a probability of success (p) is used or a probability of failure (1−p) is used, it is therefore possible to consider a probability meeting or exceeding a probability threshold as meaning the request is likely to fail.

As illustrated, the CB is tripped after the counter reaches the CB threshold value, based on successive requests having a probability (provided by the statistical estimator 202) that is below a probability threshold. In addition to incrementing the counter based on the statistical estimator 202, the counter may also be incremented if a request that is made results in a failure. Further, the CB may be tripped following a series of requests, some of which are successful requests and others that either are failed requests or have corresponding probabilities that are below the probability threshold, provided that the counter exceeds the CB threshold. In some embodiments, the counter may only count failed requests or probabilities that are below the probability threshold from a certain time window (e.g., the preceding five minutes, half hour, 24 hours, etc.).

Accordingly, a modified CB technique is provided where the statistical estimator 202 is introduced.

Embodiments herein may be applied to control access to a given channel or service in a Business Support System (BSS), among other things. For example, embodiments may be applied in the following circumstances:

- Provisioning customer data towards non-relational databases (where failure scenarios may lead to inconsistent data created (i.e. orphan data).
- Orchestrating multi-step transactions across multiple services (where failure scenarios may also lead to partially executed transactions with possibly inconsistent data).
- Orchestrating multi-step charging based operations (where failure scenarios may lead to inconsistent charges to the end-user.

Figure 3A:
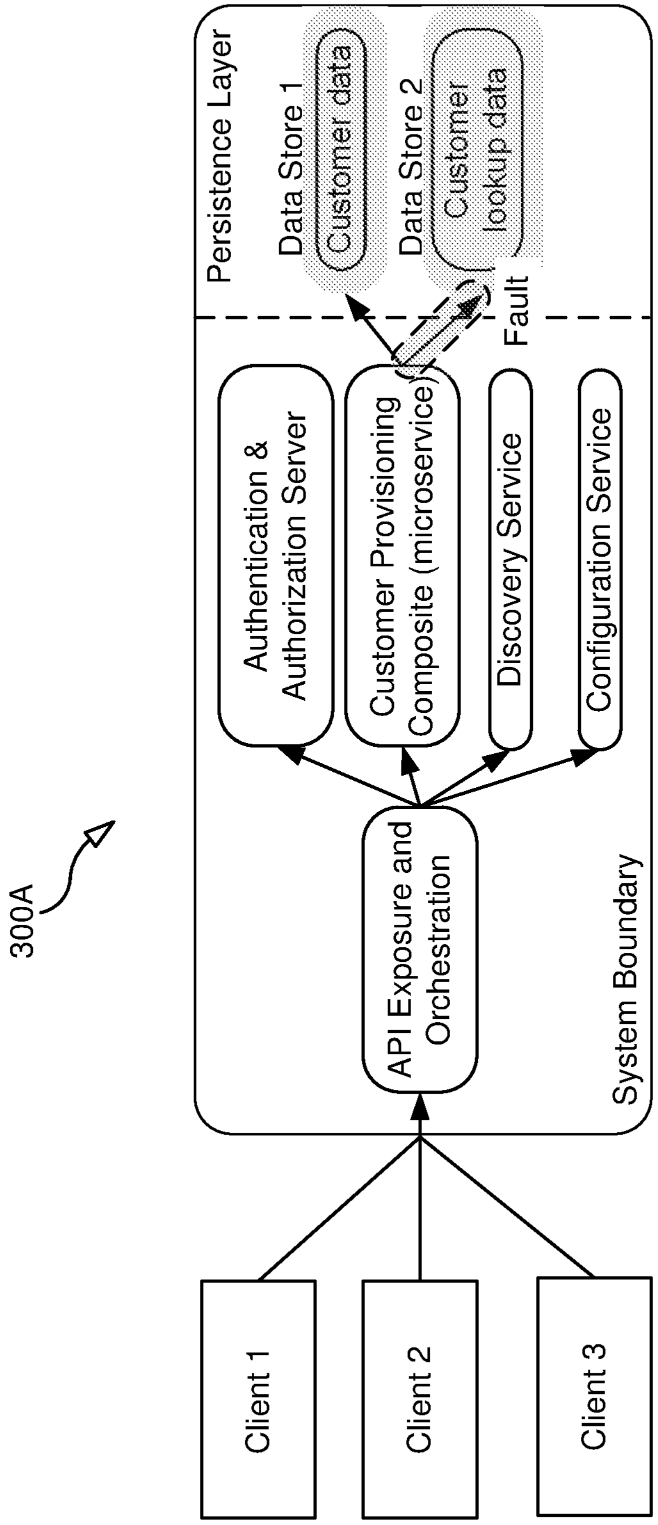
FIG. 3A illustrates a system according to an embodiment.

FIG. 3A illustrates a system 300A according to an embodiment. Multiple clients (shown as clients 1, 2, and 3) may be in communication with a BSS system. The BSS system may be a single physical server composed of multiple virtual servers, or may be multiple physical servers e.g. distributed geographically, or may include some other configuration. The BSS system may include an API Exposure and Orchestration layer which orchestrates client invocations across multiple services dealing with authentication & authorization, customer provisioning (composite), discovery & configuration services, and so on. The customer provisioning service, for example, may persist data across different data stores, e.g. one to maintain the actual customer data, and another for its index to enable faster lookups. Embodiments of the modified CB technique described herein may be used within the BSS system.

FIG. 3A shows persistence orchestration. A fault in Data Store 2 can lead to a failure to store customer lookup data for the customer provisioning, which in turn may lead to orphan data in Data Store 1.

Figure 3B:
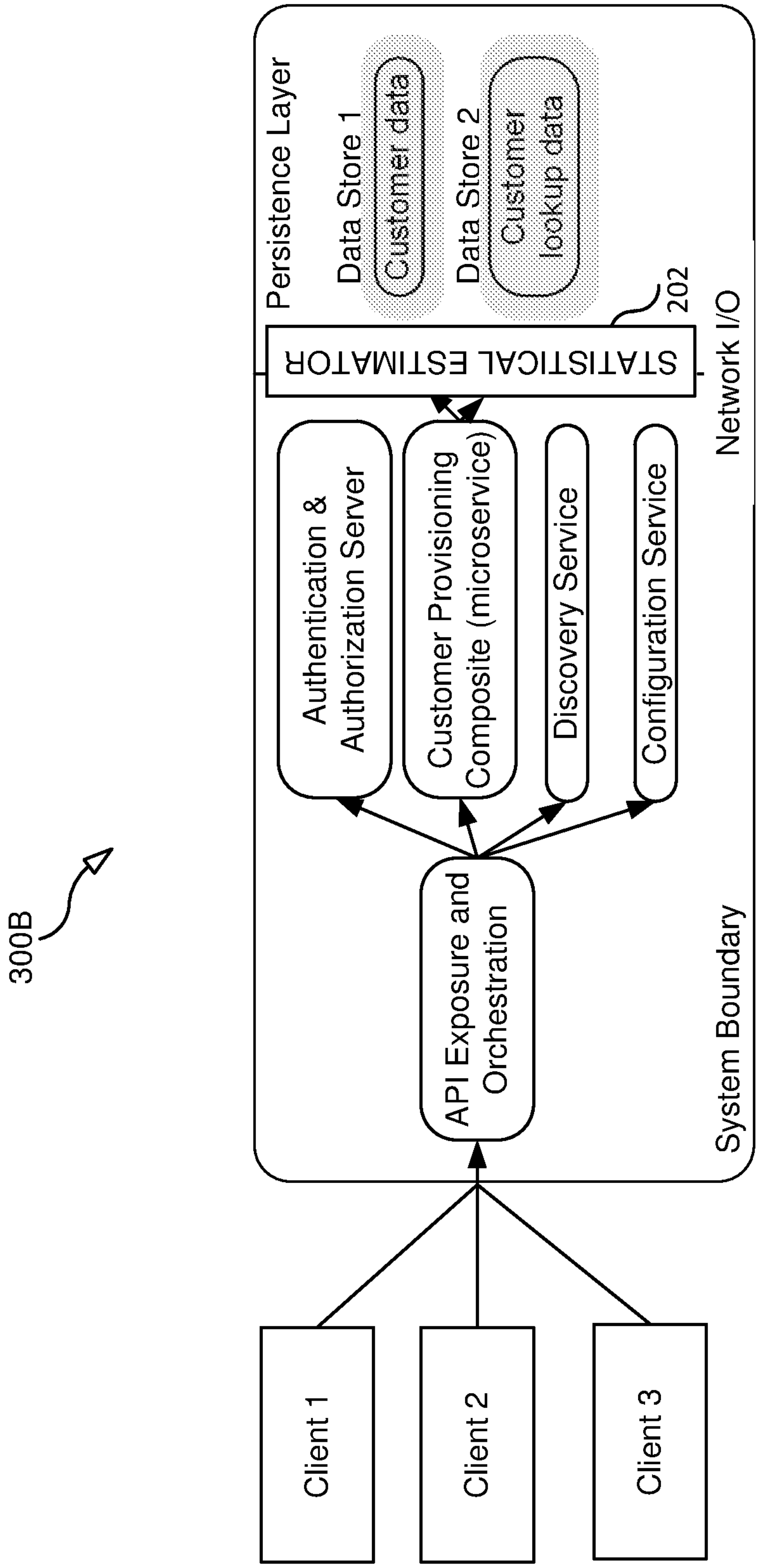
FIG. 3B illustrates a system according to an embodiment.

FIG. 3B illustrates a system 300B according to an embodiment. System 300B is similar to system 300A, except that statistical estimator 202 is illustrated as being provided on the customer provisioning (composite). Prior to the customer provisioning (composite) making a request to either Data Store 1 or Data Store 2 the statistical estimator 202 is checked to determine a probability that the request will fail. In this example, the customer provisioning (composite) is acting as a client to Data Store 1 and Data Store 2 on the persistence layer. Because both storage operations—storing the customer data and storing the customer data lookup data—must be successful to maintain consistency, the statistical estimator 202 may in some embodiments determine a probability that either or both storage operations will fail, and block the requests from being made if the probability is below a probability threshold.

The situation shown in FIG. 3A can be prevented here by the introduction of statistical estimator 202. That is, inconsistent request execution can be prevented because the statistical estimator 202 may indicate that the probability to succeed with Data Store 2 is low (or, equivalently, that the probability to fail is high) and therefore the composite request for customer provisioning can be prevented from being executed towards the persistence layer. As shown, the multiple storage operations that must be coordinated each originate with the customer provisioning (composite) service, though in other examples multiple services may need to coordinate storage operations. That is, the statistical estimator 202 may be coupled to multiple services e.g. as they access the persistence layer.

Figure 4A:
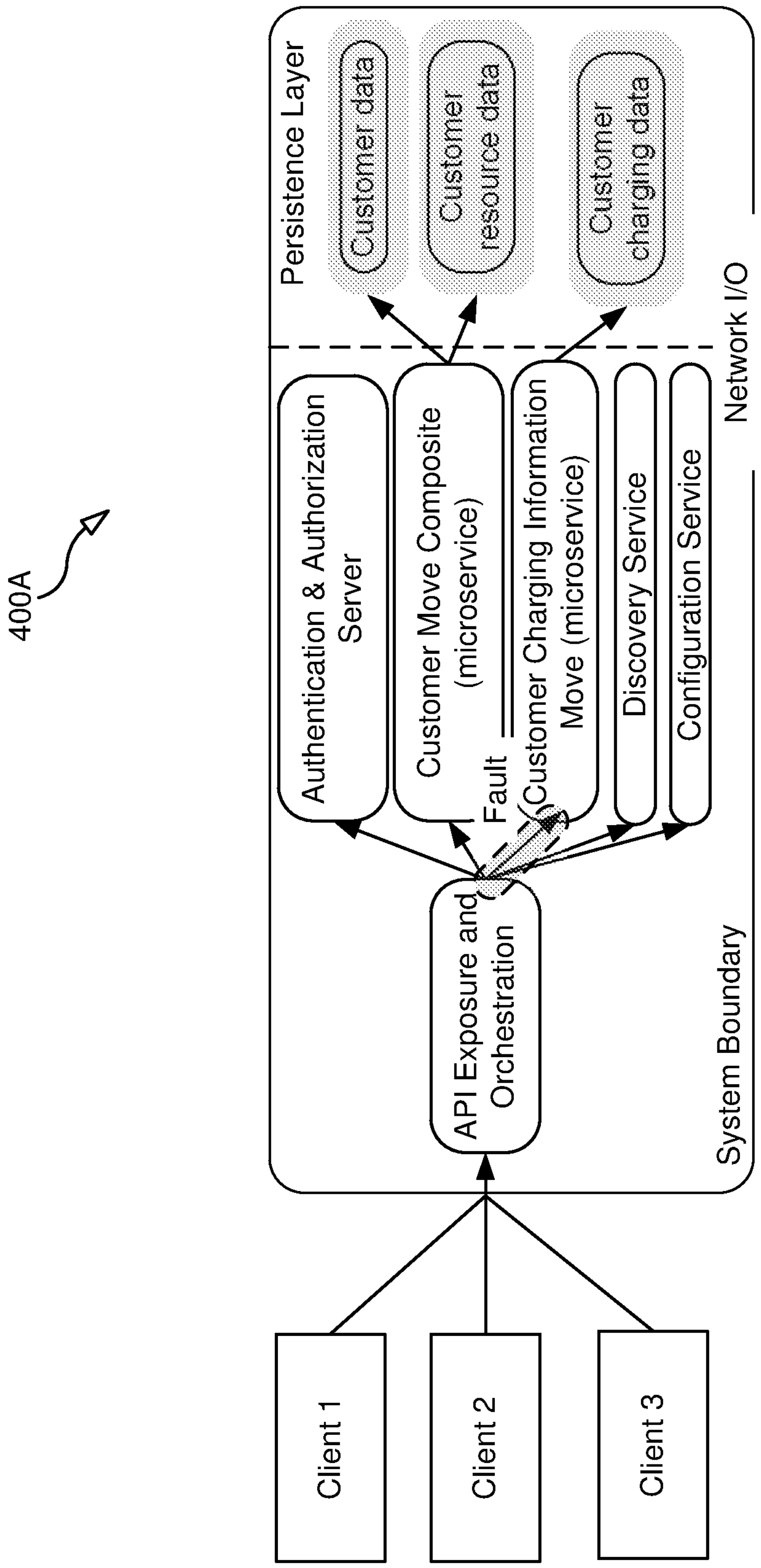
FIG. 4A illustrates a system according to an embodiment.

FIG. 4A illustrates a system 400A according to an embodiment. System 400A is similar to system 300A, except that FIG. 4A shows an example of a fault in API orchestration. The API exposure and orchestration layer determines that the client request for a "customer move" (for example) needs to span two services internally, i.e. customer move (composite) and customer charging information move. However, as shown, the customer charging information move service is having an outage, and therefore the client customer move request leads to an inconsistent state in the system with partially moved data which needs to be rolled back or otherwise mitigated.

Figure 4B:
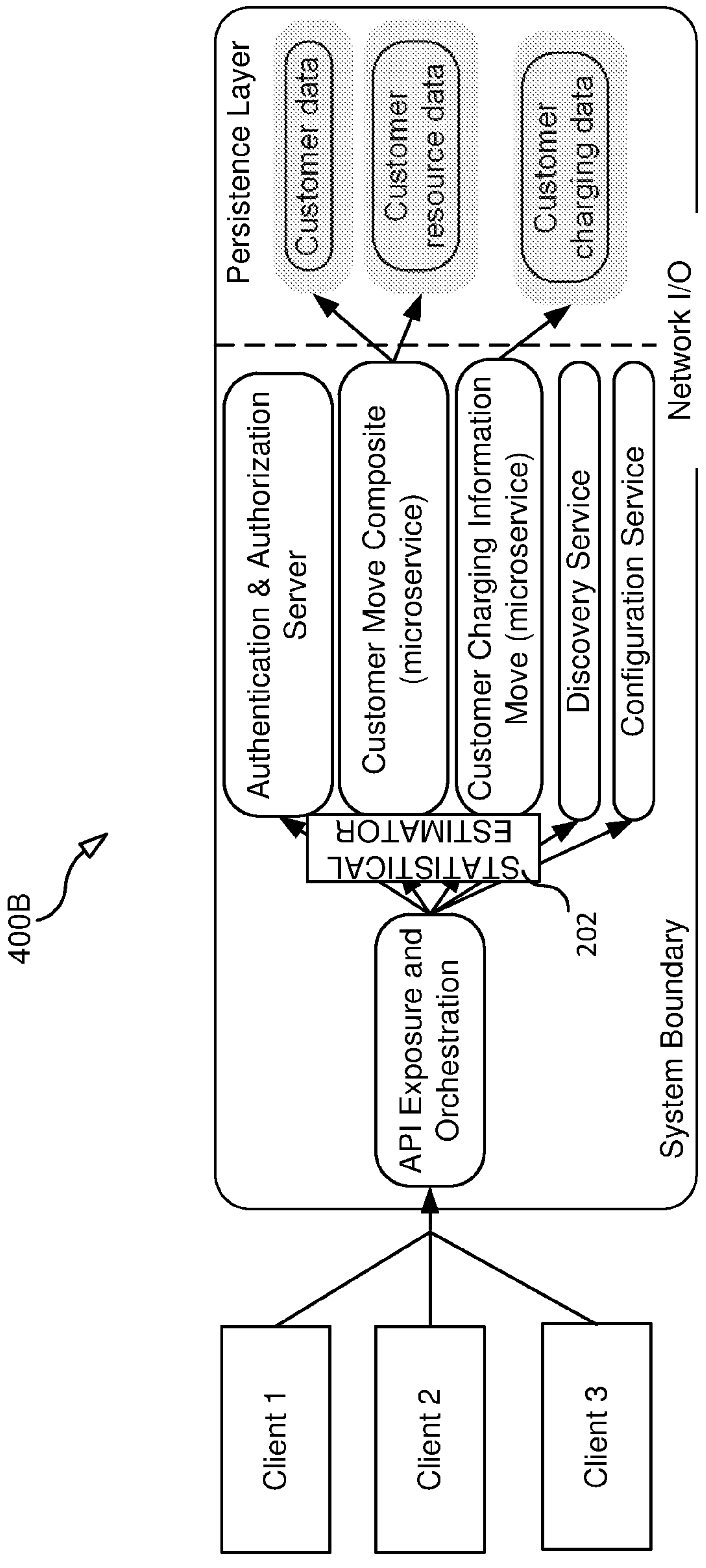
FIG. 4B illustrates a system according to an embodiment.

FIG. 4B illustrates a system 400B according to an embodiment. System 400B is similar to system 400A, except that statistical estimator 202 is illustrated as being provided on the API exposure and orchestration layer. Prior to the API exposure and orchestration layer making a request to either customer move (composite) or customer charging information move, the statistical estimator 202 is checked to determine a probability that the request will fail. In this example, the API exposure and orchestration layer is acting as a client to customer move (composite) and customer charging information move services. Because both service operations—customer move (composite) and customer charging information move—must be successful to maintain consistency, the statistical estimator 202 may in some embodiments determine a probability that either or both service operations will fail, and block the requests from being made if the probability is below a probability threshold.

The situation shown in FIG. 4A can be prevented here by the introduction of statistical estimator 202. That is, inconsistent request execution can be prevented because the statistical estimator 202 may indicate that the probability to succeed with customer charging information move is low (or, equivalently, that the probability to fail is high) and therefore the composite request for customer move can be prevented from being executed towards the system.

Orchestration can be done in multiple ways. For example, FIGS. 3A and 3B represent orchestration of calls towards the persistence layer, while FIGS. 4A and 4B represent orchestration of invocations across different services. The statistical estimator 202, e.g. statistical estimator function (Σ), can prevent partial execution of the composite invocations in both of the above cases.

Figure 5A:
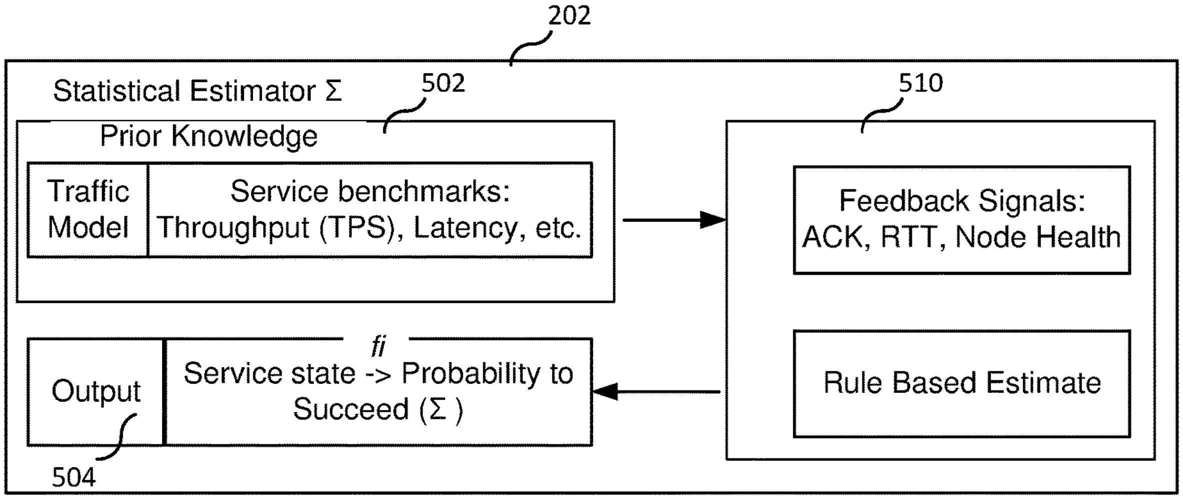
FIG. 5A illustrates a statistical estimator according to an embodiment.
Figure 5B:
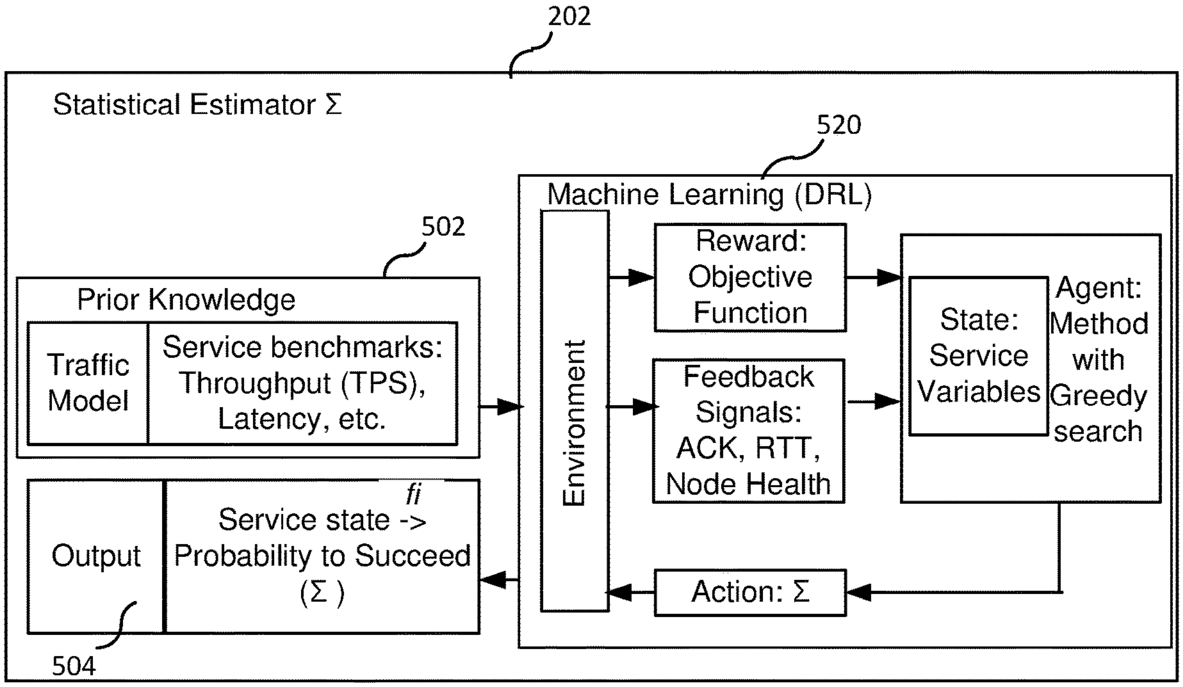
FIG. 5B illustrates a statistical estimator according to an embodiment.

FIGS. 5A and 5B illustrate statistical estimator 202 according to embodiments. A statistical estimator 202 sits between a client making requests to a server and determines a probability that the request will succeed (or fail). The statistical estimator 202 may interface between multiple clients and/or servers and may base its probability determination on a combination of information from one or more of those clients and servers. As shown in FIG. 5A, statistical estimator 202 may include a prior knowledge store 502, a rule-based estimator 510, and an output 504 mapping a given service state to a probability to succeed based on the rule-based estimator 510. Prior knowledge store 502 may store data regarding past service requests (both successful and failed), including service benchmarks such as throughput (e.g., transactions per second (TPS)) and latency. Prior knowledge store 502 may also include a traffic model. Rule-based estimator 510 generates a probability based on prior knowledge store 502 and feedback signals (such as indications of success, e.g. acknowledgments (ACKS), or failure, e.g. negative acknowledgements (NACKS), and other information such as round-trip time (RTT), and a sensed state of the system such as node state or node health). The rule-based estimator 510 uses a series of rules to calculate a probability that the request will succeed that is then fed into output 504. If the probability to succeed is high, the request is likely to succeed; if the probability to succeed is low, the request is likely to fail. By the same principles, the statistical estimator 202 may also estimate a probability to fail.

As shown in FIG. 5B, statistical estimator 202 may include a prior knowledge store 502, a machine learning estimator 520, and an output 504 mapping a given service state to a probability to succeed based on the machine learning estimator 520. Prior knowledge store 502 may store data regarding past service requests (both successful and failed), including service benchmarks such as throughput (e.g., transactions per second (TPS)) and latency. Prior knowledge store 502 may also include a traffic model. Machine learning estimator 520 generates a probability based on prior knowledge store 502 and feedback signals (such as acknowledgments (ACKS) or negative acknowledgements (NACKS), round-trip time (RTT), sensed state of the system such as node state or node health). The machine learning estimator 520 uses a machine learning technique to calculate a probability that the request will succeed that is then fed into output 504. If the probability to succeed is high, the request is likely to succeed; if the probability to succeed is low, the request is likely to fail. By the same principles, the statistical estimator 202 may also estimate a probability to fail. For example, the machine learning technique may include a deep reinforcement learning (DRL) model (as shown), or it may include another machine learning technique such as a neural network, support vector machine, hidden Markov model, and so on.

Taking the BSS systems described above as an example, a call to one service (e.g., customer provisioning (composite)) may result in a call to further services (e.g., storage operations on the persistence layer). In some embodiments, there may be statistical estimators 202 provided for each layer where service calls are made. In some embodiments, a statistical estimator 202 associated with an initial service (e.g., customer provisioning (composite)) may receive information from a statistical estimator 202 associated with a later service (e.g., storage operations on the persistence layer), including a probability that the later service is likely to succeed. The information from statistical estimators 202 associated with later services may be used by the statistical estimator 202 associated with an initial service.

For the DRL case, as shown, the reward function is a function which describes how the agent "ought" to behave. These functions may be thought to be a weight for a state and an action pair, which assign the relative importance of a transition from a given state with a given action with respect to our objective. Different use cases may warrant different reward functions. The service variables may include the current state of the system as represented by the state of the service(s) it is composed of. These services in turn may be represented by different variables such as their ongoing throughput, request latency, etc. This information may be used by the DRL model to generate a probability.

In embodiments, statistical estimator 202 may be a combination of the rule-based approach (FIG. 5A) and the machine learning approach (FIG. 5B).

Figure 6:
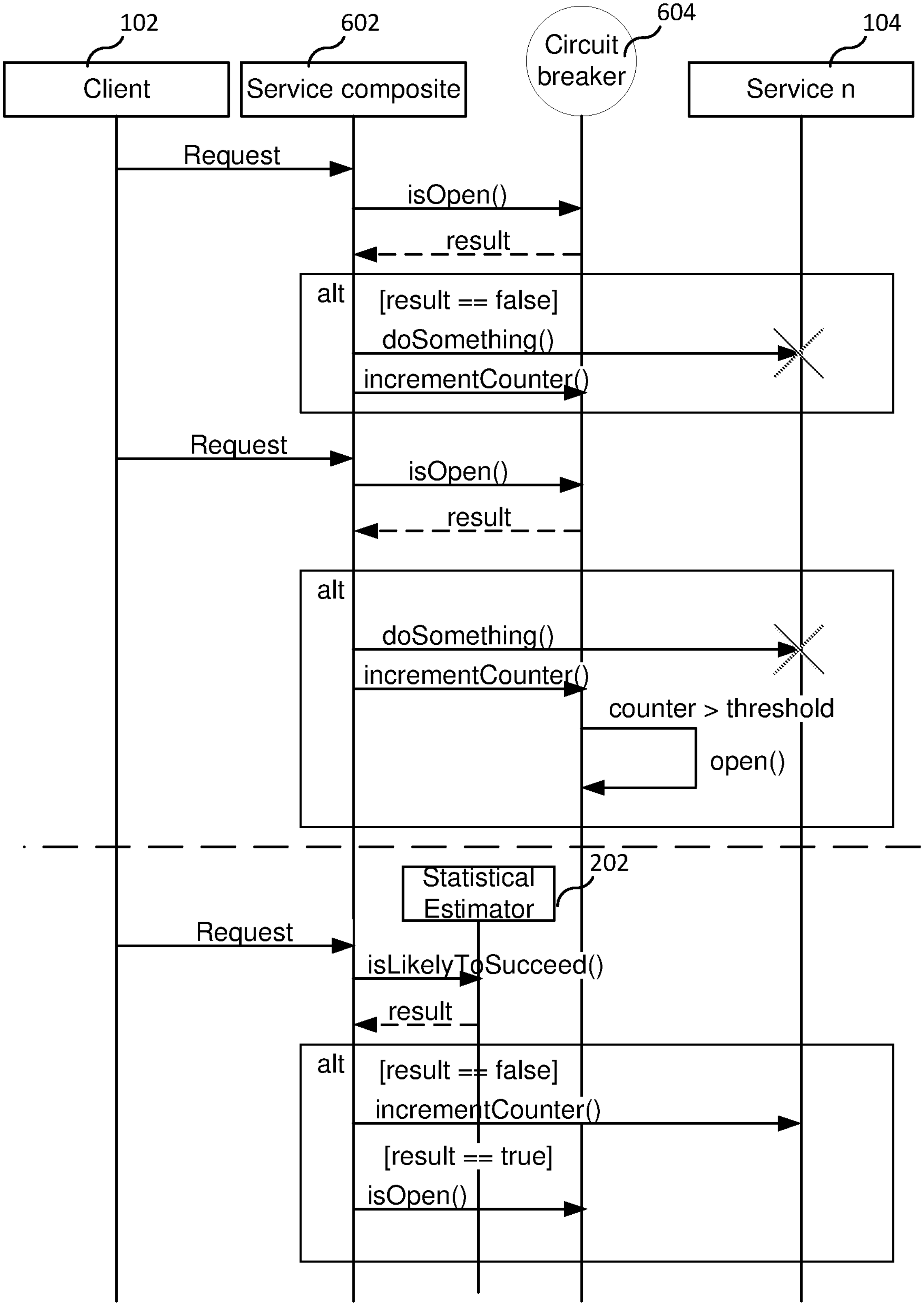
FIG. 6 illustrates a flow diagram according to an embodiment.

FIG. 6 illustrates a flow diagram according to an embodiment. Client 102 communicates with service composite 602, CB 604, and server 104. Service composite 602 may also communicate with statistical estimator 202, and may reside with client 102, CB 604, server 104, or as a separate entity. Similarly, CB 604 may reside with client 102, statistical estimator 202, server 104, or as a separate entity.

The two requests above the dotted line illustrate the flow without the statistical estimator 202. As shown, client 102 makes a request that is intercepted by service composite 602. Service composite 602 checks whether CB 604 is open. If not (i.e. normal operation), service composite 602 forwards the request to server 104. If the request fails, then a CB counter is incremented. If the counter is incremented and it exceeds a CB threshold, then the CB is tripped to its open state.

The request below the dotted line illustrates the flow with the statistical estimator 202. Client 102 makes a request that is intercepted by service composite 602. Service composite 602 checks with statistical estimator 202 to determine a probability that the request will succeed. If the request is not likely to succeed, then a CB counter is incremented. If the request is likely to succeed, then the service composite 602 forwards the request to the server 104, optionally checking whether CB 604 is open first as in the flow without the statistical estimator 202.

The statistical estimator 202 is optimized in terms of latency, network overhead, and end-user feedback, because it works on a proactive strategy of limiting unsuccessful invocation as opposed to the traditional CB technique which in part is a reactive strategy as it waits for failures to happen before taking action.

Figure 7:
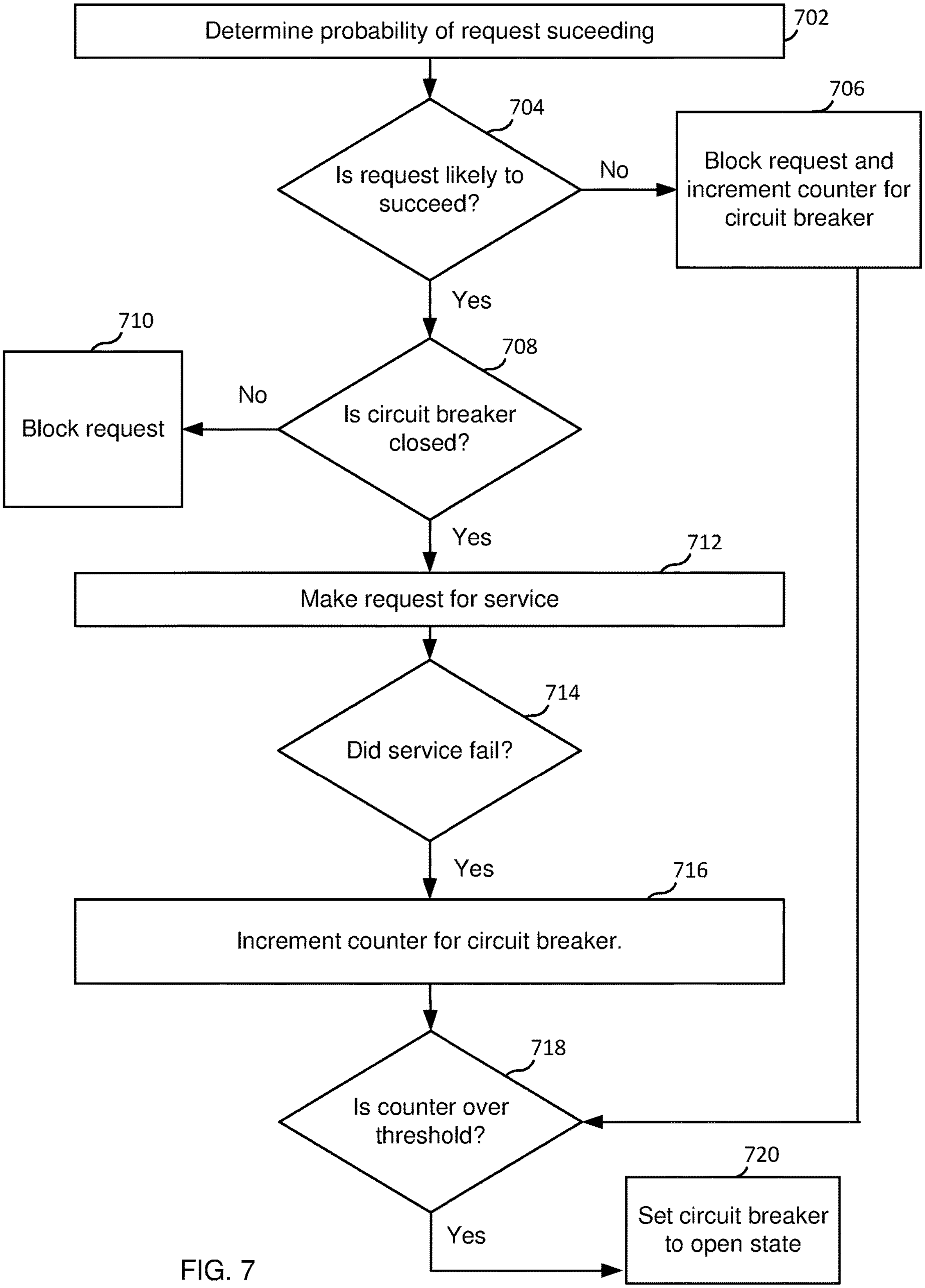
FIG. 7 illustrates a flowchart according to an embodiment.

FIG. 7 illustrates a flowchart according to an embodiment. The process begins with determining a probability of a request succeeding, at 702. A check, at 704, is made to determine whether the request is likely to succeed based on the determined probability. If the probability meets or exceeds a probability threshold, the request is likely to succeed and the process may proceed to 708. If the probability is below the probability threshold, the request is not likely to succeed and the process may proceed to 706. At 706, the request is blocked and a counter is incremented. Following the counter being incremented the process may proceed to 720. At 708, a further check is made, to determine if the circuit breaker is closed. If it is closed (normal operation), then the process may proceed to 712, and if it is open (circuit breaker has been tripped), then the process may proceed to 710. At 710, the request is blocked. At 712, the request for service is made. A check, at 714, is made to determine whether the requested service resulted in failure. If the requested service resulted in failure, then the process may proceed to 716, where the counter is incremented. A check, at 718, is made to determine whether the counter is over the threshold. If the counter is over the threshold, the process proceeds to 720, where the circuit breaker is tripped, i.e. it is transitioned to its open state. Once open, the circuit breaker may be reset upon a determination to reset the circuit breaker.

Figure 8:
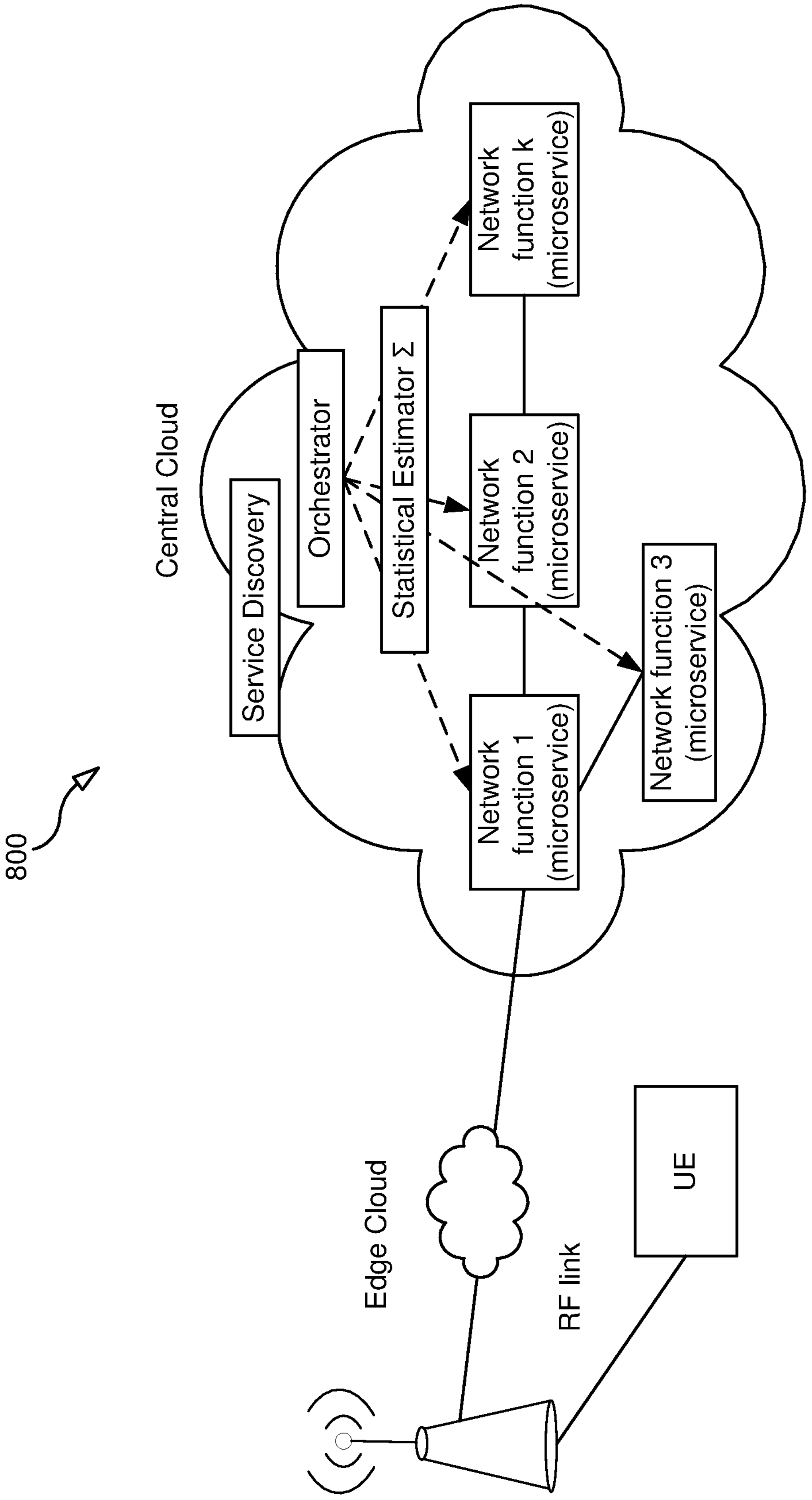
FIG. 8 illustrates a system according to an embodiment.

FIG. 8 illustrates system 800 according to an embodiment. System 800 may include a cloud computing environment, such as used by mobile networks, e.g. in 5G. Network Function Virtualization (NFV) architecture is a key enabler to integrate cloud resources with telecom infrastructure. If we now consider each Network Function (NF) as a service or microservice, the CB statistical estimator 202 may be used in the orchestrator layer based upon probabilistic estimates to reduce inconsistent execution in the system, while improving network performance by reducing erroneous roundtrips. Embodiments may also augment the notion of autonomous resilience in cognitive networks.

An exemplary probability estimation algorithm is now provided. In this example, a probability to succeed for a persistence service is being estimated.

The estimation output is the value between 0 and 1 with following exemplary meanings:

0—nothing is expected to work 0.25—we expect the request to fail, but it might work 0.5—There are problems and there will be some failures 0.75—There are problems, but we expect everything to work 1—No problems detected, everything should work A rules-based algorithm may, for example, include the following rules:

```
if (all nodes are down or overloaded)
  successChance=0
else if (half or more of nodes down or overloaded):
  successChance=0.25
else if (ONE or more nodes are overloaded):
  successChance=0.5
else if (THREE or more nodes are down AND consistency
  level is ONE):
  successChance=0.5
else if (TWO or more nodes are down):
  successChance=0.5
else if (ONE node is down):
  successChance=0.75
else
  successChance=1
```

Given a preferred data center (DC) with 3 Persistent Service nodes and a preferred DC with 10 Persistent Service nodes, sample successChance values could be as below. A given node may be considered overloaded if its reported rejection level is greater than or equal to the request priority. In the example here, a consistency level indication from the persistence service may also impact the estimation.

| Overall nodes in DC | Nodes UP | Nodes overloaded | Consistency level | Estimation |
|---|---|---|---|---|
| 3 | 3 | | LOCAL_QUORUM | 1.00 |
| 3 | 3 | | LOCAL_ONE | 1.00 |
| 3 | 2 | | LOCAL_QUORUM | 0.75 |
| 3 | 2 | | LOCAL_ONE | 0.75 |
| 3 | 1 | | LOCAL_QUORUM | 0.25 |
| 3 | 1 | | LOCAL_ONE | 0.25 |
| 3 | 3 | 1 | LOCAL_QUORUM | 0.50 |
| 3 | 3 | 1 | LOCAL_ONE | 0.50 |
| 3 | 3 | 2 | LOCAL_QUORUM | 0.25 |
| 3 | 3 | 2 | LOCAL_ONE | 0.25 |
| 3 | 3 | 3 | LOCAL_ONE | 0.00 |
| 3 | 2 | 1 | LOCAL_ONE | 0.50 |
| 3 | 2 | 1 | LOCAL_QUORUM | 0.50 |
| 3 | 2 | 2 | LOCAL_ONE | 0.00 |
| 3 | 2 | 2 | LOCAL_QUORUM | 0.00 |
| 10 | 8 | 2 | LOCAL_ONE | 0.50 |
| 10 | 8 | 2 | LOCAL_QUORUM | 0.50 |
| 10 | 8 | 6 | LOCAL_ONE | 0.25 |
| 10 | 8 | 6 | LOCAL_QUORUM | 0.25 |

Figure 9A:
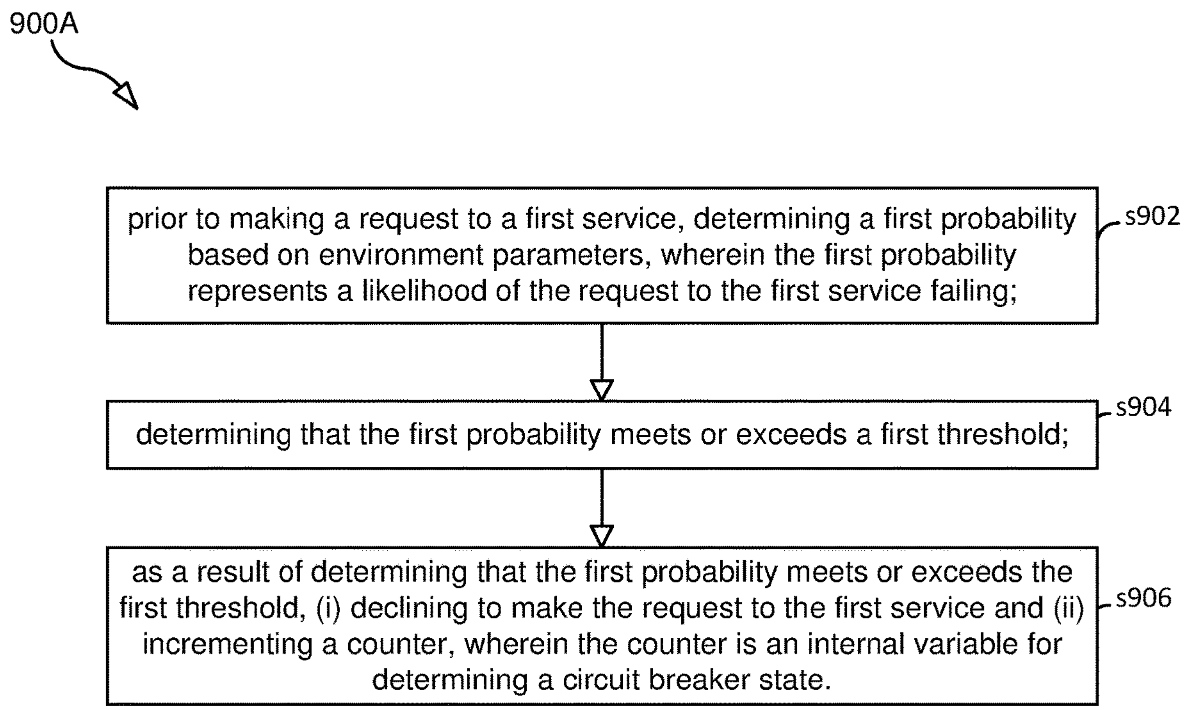
FIG. 9 is a flowchart illustrating a process according to some embodiments.

FIG. 9A is a flowchart illustrating a process 900A, according to an embodiment, for providing resilience in a computing environment. Process 900A may begin in step s902.

Step s902 comprises, prior to making a request to a first service, determining a first probability based on environment parameters, wherein the first probability represents a likelihood of the request to the first service failing.

Step s904 comprises determining that the first probability meets or exceeds a first threshold.

Step s906 comprises, as a result of determining that the first probability meets or exceeds the first threshold, (i) declining to make the request to the first service and (ii) incrementing a counter, wherein the counter is an internal variable for determining a circuit breaker state.

Figure 9B:
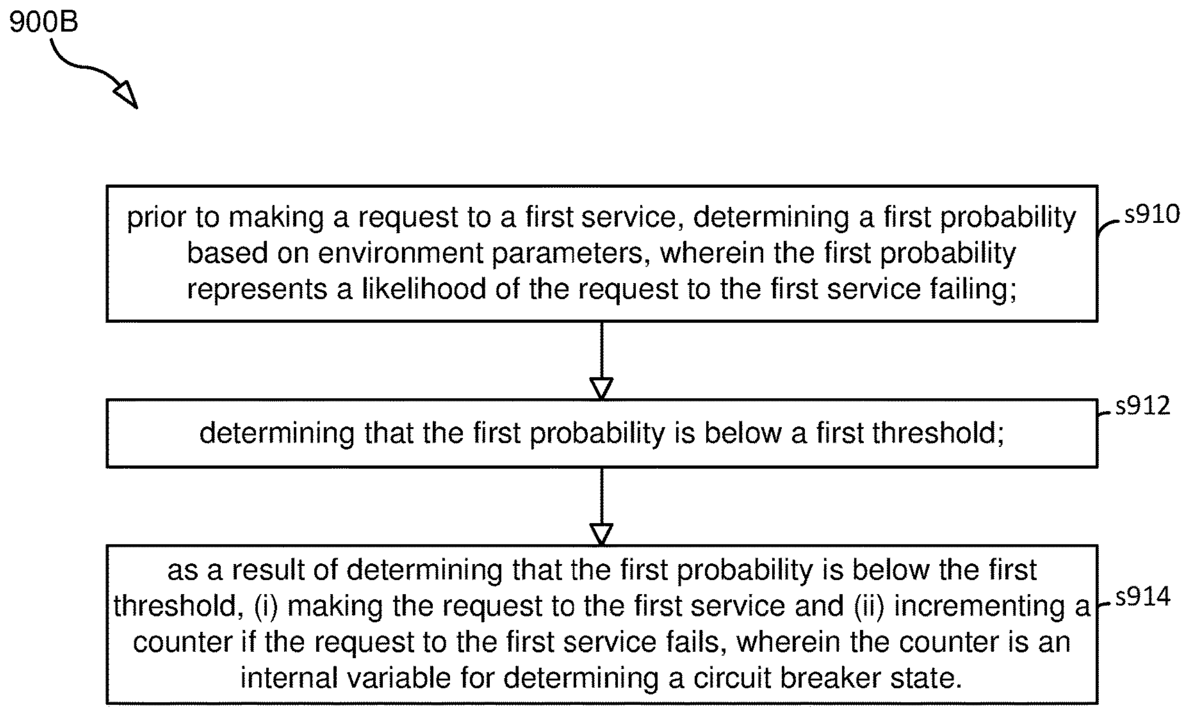

FIG. 9B is a flowchart illustrating a process 900B, according to an embodiment, for providing resilience in a computing environment. Process 900B may begin in step s910.

Step s910 comprises, prior to making a request to a first service, determining a first probability based on environment parameters, wherein the first probability represents a likelihood of the request to the first service failing.

Step s912 comprises determining that the first probability is below a first threshold.

Step s914 comprises, as a result of determining that the first probability is below the first threshold, (i) making the request to the first service and (ii) incrementing a counter if the request to the first service fails, wherein the counter is an internal variable for determining a circuit breaker state.

One or more of process 900A and process 900B may include additional steps or elements, as further described herein. In some embodiments, the method may further include, prior to making additional requests to the first service, determining additional probabilities based on environment parameters, wherein the additional probabilities represent a likelihood of the additional requests to the first service failing. The method may further include determining, for each of the additional requests to the first service, whether the corresponding probability meets or exceeds the first threshold. The method may further include, for each of the additional requests to the first service, if the corresponding probability meets or exceeds the first threshold (i) declining to make the corresponding request to the first service and (ii) incrementing the counter; and if the corresponding probability is below the threshold then (i) making the corresponding request to the first service and (ii) incrementing the counter if the corresponding request to the first service fails. The method may further include determining that the counter exceeds a second threshold. The method may further include, as a result of determining that the counter exceeds the second threshold, transitioning to an open circuit breaker state for the first service, where requests to the first service are disabled during the open circuit breaker state.

In some embodiments, determining a first probability based on environment parameters comprises using a rule-based estimator. In some embodiments, determining a first probability based on environment parameters comprises using machine learning. In some embodiments, using machine learning includes applying deep reinforcement learning. In some embodiments, the environment parameters the first probability is based on feedback signals from the first service, including one or more of a round-trip time, an acknowledgement (ACK) message, a negative acknowledgment (NACK) message, a node state indicator, and a cluster health indicator. In some embodiments, the first service performs a storage operation. In some embodiments, the first service performs a charging function. In some embodiments, the first service comprises a group of services or microservices. In some embodiments, the first service is provided by a node in a telecommunications network, and determining the first probability based on environment parameters is performed in a cloud computing environment. In some embodiments, the first service is a network function managed by an orchestration layer.

Figure 10:
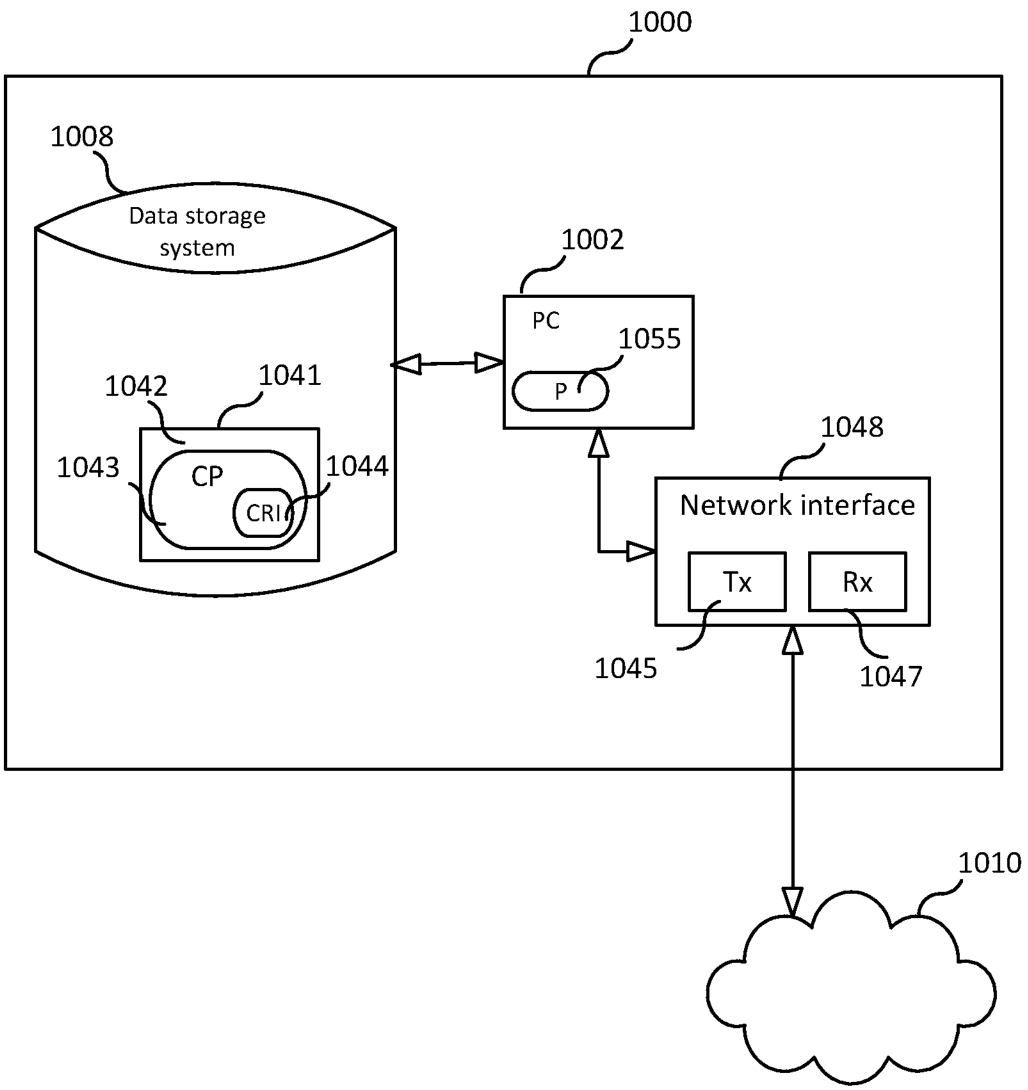
FIG. 10 is a block diagram of an apparatus according to some embodiments.

FIG. 10 is a block diagram of apparatus 1000 (e.g., a server 104, statistical estimator 202, service composite 602, CB 604), according to some embodiments, for performing the methods disclosed herein. As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 1010 (e.g., an Internet Protocol (IP) network) to which network interface 1048 is connected (directly or indirectly) (e.g., network interface 1048 may be wirelessly connected to the network 1010, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

Summary of Various Embodiments

A1. A method for providing resilience in a computing environment, the method comprising:

prior to making a request to a first service, determining a first probability based on environment parameters, wherein the first probability represents a likelihood of the request to the first service failing;

determining that the first probability meets or exceeds a first threshold;

as a result of determining that the first probability meets or exceeds the first threshold, (i) declining to make the request to the first service and (ii) incrementing a counter, wherein the counter is an internal variable for determining a circuit breaker state.

A1'. A method for providing resilience in a computing environment, the method comprising:

prior to making a request to a first service, determining a first probability based on environment parameters, wherein the first probability represents a likelihood of the request to the first service failing;

determining that the first probability is below a first threshold;

as a result of determining that the first probability is below the first threshold, (i) making the request to the first service and (ii) incrementing a counter if the request to the first service fails, wherein the counter is an internal variable for determining a circuit breaker state.

A2. The method of one of embodiments A1 and A1', further comprising:

prior to making additional requests to the first service, determining additional probabilities based on environment parameters, wherein the additional probabilities represent a likelihood of the additional requests to the first service failing;

determining, for each of the additional requests to the first service, whether the corresponding probability meets or exceeds the first threshold;

for each of the additional requests to the first service, if the corresponding probability meets or exceeds the first threshold (i) declining to make the corresponding request to the first service and (ii) incrementing the counter; and if the corresponding probability is below the threshold then (i) making the corresponding request to the first service and (ii) incrementing the counter if the corresponding request to the first service fails;

determining that the counter exceeds a second threshold; and as a result of determining that the counter exceeds the second threshold, transitioning to an open circuit breaker state for the first service, where requests to the first service are disabled during the open circuit breaker state.

A3. The method of any one of embodiments A1, A1', and A2, wherein determining a first probability based on environment parameters comprises using a rule-based estimator.

A4. The method of any one of embodiments A1, A1', and A2, wherein determining a first probability based on environment parameters comprises using machine learning.

A5. The method of embodiment A4, wherein using machine learning includes applying deep reinforcement learning.

A6. The method of any one of embodiments A1, A1', and A2-A5, wherein the environment parameters the first probability is based on feedback signals from the first service, including one or more of a round-trip time, an acknowledgement (ACK) message, a negative acknowledgment (NACK) message, a node state indicator, and a cluster health indicator.

A7. The method of any one of embodiments A1, A1', and A2-A6, wherein the first service performs a storage operation.

A8. The method of any one of embodiments A1, A1', and A2-A6, wherein the first service performs a charging function.

A9. The method of any one of embodiments A1, A1', and A2-A8, wherein the first service comprises a group of services or microservices.

A10. The method of any one of embodiments A1, A1', and A2-A9, wherein the first service is provided by a node in a telecommunications network, and determining the first probability based on environment parameters is performed in a cloud computing environment.

A11. The method of embodiment A10, wherein the first service is a network function managed by an orchestration layer.

C1. A computer program (1143) comprising instructions which when executed by processing circuitry (1102) of a node (1100), causes the node (1100) to perform the method of any one of embodiments A1, A1', and A2-A11.

C2. A carrier containing the computer program (1143) of embodiment C1, wherein the carrier is one of an electronic signal, an optical signal, a radio signal, and a computer readable storage medium (1142).

D1. A network node (1100), the network node comprising:

processing circuitry (1102); and a memory, the memory containing instructions (1144) executable by the processing circuitry (1102), whereby the network node (1100) is configured to perform the method of any one the embodiments A1, A1', and A2-A11.

E1. A network node (1100) for providing resilience in a computing environment, the network node (1100) being configured to:

prior to making a request to a first service, determine a first probability based on environment parameters, wherein the first probability represents a likelihood of the request to the first service failing;

determine that the first probability meets or exceeds a first threshold;

as a result of determining that the first probability meets or exceeds the first threshold, (i) decline to make the request to the first service and (ii) increment a counter, wherein the counter is an internal variable for determining a circuit breaker state.

E1'. A network node (1100) for providing resilience in a computing environment, the network node (1100) being configured to:

prior to making a request to a first service, determine a first probability based on environment parameters, wherein the first probability represents a likelihood of the request to the first service failing;

determine that the first probability meets or exceeds a first threshold;

as a result of determining that the first probability meets or exceeds the first threshold, (i) make the request to the first service and (ii) increment a counter if the request to the first service fails, wherein the counter is an internal variable for determining a circuit breaker state.

E2. The network node of embodiment E1, wherein the network node is further configured to perform the method of any one of embodiments A2-A10.

E3. The network node of embodiment E1', wherein the network node is further configured to perform the method of any one of embodiments A2-A10.

While various embodiments are described herein, it should be understood that they have been presented by way of example only, and not limitation. Thus, the breadth and scope of this disclosure should not be limited by any of the above described exemplary embodiments. Moreover, any combination of the above-described embodiments in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for providing resilience in a computing environment, the method comprising:

prior to making a request to a first service, determining a first probability based on environment parameters, wherein the first probability represents a likelihood of the request to the first service failing;

determining that the first probability meets or exceeds a first threshold;

as a result of determining that the first probability meets or exceeds the first threshold, (i) declining to make the request to the first service and (ii) incrementing a counter, wherein the counter is an internal variable for determining a circuit breaker state.

2. The method of claim 1, further comprising:

prior to making a second request to the first service, determining a second probability based on environment parameters, wherein the second probability represents a likelihood of the second request to the first service failing;

determining that the second probability is below the first threshold;

as a result of determining that the second probability is below the first threshold, (i) making the second request to the first service and (ii) incrementing a counter if the second request to the first service fails, wherein the counter is an internal variable for determining a circuit breaker state.

3. The method of claim 1, further comprising:

prior to making additional requests to the first service, determining additional probabilities based on environment parameters, wherein the additional probabilities represent a likelihood of the additional requests to the first service failing;

determining, for each of the additional requests to the first service, whether the corresponding probability meets or exceeds the first threshold;

for each of the additional requests to the first service, if the corresponding probability meets or exceeds the first threshold (i) declining to make the corresponding request to the first service and (ii) incrementing the counter; and if the corresponding probability is below the threshold then (i) making the corresponding request to the first service and (ii) incrementing the counter if the corresponding request to the first service fails;

determining that the counter exceeds a second threshold; and as a result of determining that the counter exceeds the second threshold, transitioning to an open circuit breaker state for the first service, where requests to the first service are disabled during the open circuit breaker state.

4. The method of claim 1, wherein determining a first probability based on environment parameters comprises using a rule-based estimator.

5. The method of claim 1, wherein determining a first probability based on environment parameters comprises using machine learning.

6. The method of claim 5, wherein using machine learning includes applying deep reinforcement learning.

7. The method of claim 1, wherein the environment parameters the first probability is based on feedback signals from the first service, including one or more of a round-trip time, an acknowledgement (ACK) message, a negative acknowledgment (NACK) message, a node state indicator, and a cluster health indicator.

8. The method of claim 1, wherein the first service performs a storage operation.

9. The method of claim 1, wherein the first service performs a charging function.

10. The method of claim 1, wherein the first service comprises a group of services or microservices.

11. The method of claim 1, wherein the first service is provided by a node in a telecommunications network, and determining the first probability based on environment parameters is performed in a cloud computing environment.

12. The method of claim 11, wherein the first service is a network function managed by an orchestration layer.

13. A network node for providing resilience in a computing environment, the network node comprising processing circuitry and memory, the memory containing instructions executable by the processing circuitry, whereby when executed the processing circuitry is configured to:

prior to making a request to a first service, determine a first probability based on environment parameters, wherein the first probability represents a likelihood of the request to the first service failing;

determine that the first probability meets or exceeds a first threshold;

as a result of determining that the first probability meets or exceeds the first threshold, (i) decline to make the request to the first service and (ii) increment a counter, wherein the counter is an internal variable for determining a circuit breaker state.

14. The network node of claim 13, wherein the processing circuitry is further configured to:

prior to making a second request to a first service, determine a second probability based on environment parameters, wherein the second probability represents a likelihood of the second request to the first service failing;

determine that the second probability is below a first threshold;

as a result of determining that the second probability is below the first threshold, (i) make the second request to the first service and (ii) increment a counter if the second request to the first service fails, wherein the counter is an internal variable for determining a circuit breaker state.

15. The network node of claim 13, wherein the processing circuitry is further configured to:

prior to making additional requests to the first service, determining additional probabilities based on environment parameters, wherein the additional probabilities represent a likelihood of the additional requests to the first service failing;

determining, for each of the additional requests to the first service, whether the corresponding probability meets or exceeds the first threshold;

for each of the additional requests to the first service, if the corresponding probability meets or exceeds the first threshold (i) declining to make the corresponding request to the first service and (ii) incrementing the counter; and if the corresponding probability is below the threshold then (i) making the corresponding request to the first service and (ii) incrementing the counter if the corresponding request to the first service fails;

determining that the counter exceeds a second threshold; and as a result of determining that the counter exceeds the second threshold, transitioning to an open circuit breaker state for the first service, where requests to the first service are disabled during the open circuit breaker state.

16. The network node of claim 14, wherein the environment parameters the first probability is based on feedback signals from the first service, including one or more of a round-trip time, an acknowledgement (ACK) message, a negative acknowledgment (NACK) message, a node state indicator, and a cluster health indicator.

* * * * *